March 22, 1932. W. F. ROCKWELL 1,850,942
ROAD VEHICLE
Filed May 22, 1928
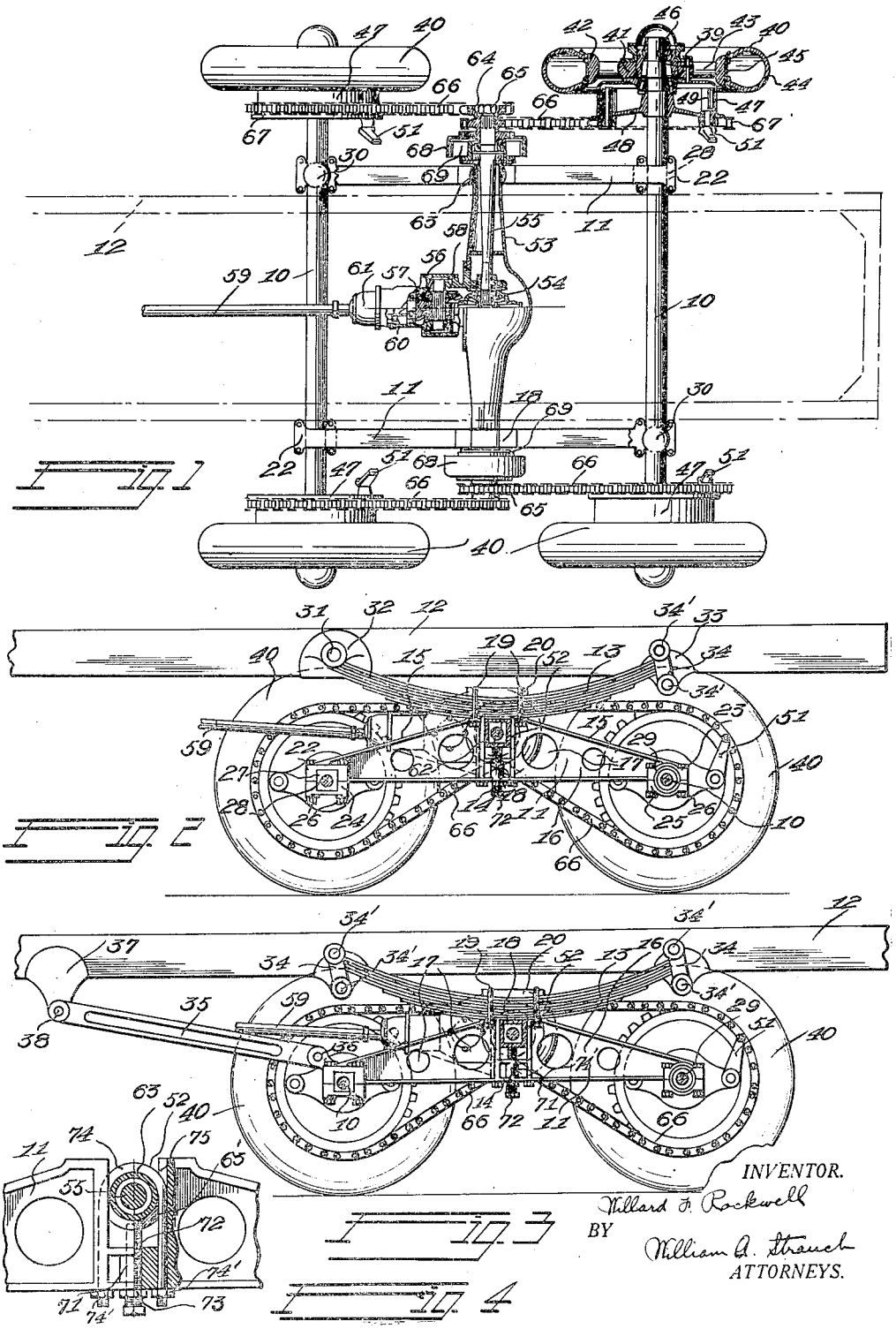

Patented Mar. 22, 1932

1,850,942

UNITED STATES PATENT OFFICE

WILLARD F. ROCKWELL, OF EDGEWOOD, PENNSYLVANIA, ASSIGNOR, BY MESNE ASSIGNMENTS, TO THE TIMKEN-DETROIT AXLE COMPANY, OF DETROIT, MICHIGAN, A CORPORATION OF OHIO

ROAD VEHICLE

Application filed May 22, 1928. Serial No. 279,708.

The present invention relates to improvements in road vehicles, and more particularly to novel tandem driven axle multi-wheel road vehicles.

Various vehicle constructions have heretofore been proposed in which tandem driven axles are provided utilizing special drive axle constructions and special torquing arrangements that have been more or less successful, but have been of expensive construction and frequently of such construction as to cause complete loss of traction if one of the wheels loses its traction grip.

A primary object of the present invention is to provide a simplified unitary tandem drive axle arrangement for road vehicles.

Another object of my invention is to provide a tandem drive axle and torquing construction in which the wheels are permitted to pass freely and individually over road irregularities and the driving torque reactions are effectively resisted while loss of traction due to wheel slippage is minimized.

A further object of the invention is to provide a tandem axle multi-wheel road vehicle construction in which the drive wheels are driven from a standard type of differential rear axle construction.

With the above objects in view as well as others that will appear from the following disclosure and the terms of the appended claims reference will be had to the accompanying drawings forming a part thereof, and in which, Figure 1 is a top plan view of a preferred form of tandem axle construction embodying my invention with parts in section, the vehicle frame being shown in dot and dash lines and the springs being omitted for the sake of clearness.

Figure 2 is a side elevational view of the structure illustrated in Figure 1 with the drive wheels and sprockets of the near side removed, Figure 3 is a side view of a modification of the invention.

Figure 4 is a fragmental view on an enlarged scale partly in elevation and partly in section illustrating the sprocket chain take up means at one side of the vehicle.

Referring to the drawings by reference characters in which like characters designate like parts, 10 designates a pair of dead axles and 11 designates a pair of side beams each of which carries and is resiliently secured to vehicle frame 12 by means of a plural leaf spring 13. As is more clearly shown in Figures 2 and 3 each beam 11 comprises a straight inner flange 14, upwardly converging outer flanges 15 and an intervening web portion 16 provided with a plurality of apertures 17 for the sake of lightness. Flanges 15 terminate short of an apex providing a flattened portion 18 intermediate the ends of beam 11 to which the intermediate portion of a spring 13 is secured by suitable clips or bolts 19 passing around saddle 20 and the ends of which pass through suitable holes in the upper flanges of beam 11 and are secured in position by nuts.

Beams 11 are provided on the opposite ends thereof with integral axle receiving and securing sections 22 and 23 provided with detachable cooperating axle securing caps 24 and 25 respectively to be secured to sections 22 and 23 by securing bolts 26 to hold axles 10 in assembled relation. As will be seen from the drawings seats 22 and cooperating caps 24 provide rectangular recesses 27 to receive complemental squared or rectangular sections 28 of axles 10, while seats 23 with caps 25 form spherical recesses 29 to receive complemental spherical or ball surfaces 30 of axles 10. A rectangular or rigid and a ball or universal connection between each axle 10 and beams 11 is in this way provided.

By this means of connection it will be seen that while beams 11 tie axles 10 together in definite relationship and each axle 10 is held against rotation due to torque reactions by the rectangular connections the combined assembly of axles 10 and beams 11 is flexible at right angles to a horizontal plane thus permitting axles 10 to move up and down and to tilt freely with relation to each other as the wheels pass over road irregularities.

In the form of invention shown in Figure 2, springs 13 are pivotally secured at their forward ends by means of axially aligned pins 31 to brackets 32 secured to opposite sides of frame 12, and at the opposite ends thereof springs 13 are shackled to brackets 33 carried by frame 12 by means of links 34 and securing pins 34'. Springs 13 being pivoted to the frame at one end and shackled thereto at the opposite end transmit the driving forces to the frame but are free to deflect freely under road shocks and accordingly to cushion the frame.

In the modification disclosed in Figure 3 both ends of springs 13 are shackled to frame 12 through links 34 and pins 34'. To hold the parts in stable relationship and to transmit the driving forces to frame 12 a pair of bars 35 are pivotally secured at one end thereof to brackets 36 rigidly secured to or formed integrally with the forward ends of beams 11, and the opposite ends thereof are pivotally secured to brackets 37 carried by frame 12 by means of securing pins 38.

Rotatably mounted on each end of each axle 10 through a suitable bearing construction 39 (Figure 1) is a vehicle drive wheel 40 which may be of any standard road vehicle wheel construction and as shown comprises a hub 41, felly 42, a plurality of spokes 43 connected to hub 41 and felly 42 and a pneumatic tire 44 detachably supported on felly 42 through the instrumentality of a demountable rim 45.

Secured to hub 41 of each drive wheel 40 by means of bolts 46 is a brake drum 47 and disposed within each drum 47 and carried by axle 10 through supporting structure 48 is an expansible brake structure 49 of any well known and suitable construction adapted to be actuated by arm 51 to engage drum 47 through a suitable brake rod which in turn is manipulated from a point adjacent the driver's position in well known manner. Side beams 11 adjacent the flat spring seating portions 18 thereof are each provided with a channeled recess 52 for receiving the opposite end portions of a standard rear axle housing 53 which is provided with the differential 54 driving stub axles 55 in well known manner.

As illustrated in Figure 1 a double reduction unit 56 is secured to axle housing 53 and comprises a bevel gear combination 57 and a spur gear combination 58 which may be of the type shown in my U. S. patent numbered 1,571,801. It is obvious that a single reduction unit may be employed in place of the double reduction unit 56 disclosed. Power is transmitted from the vehicle motor through drive shaft 59 which is connected with the propeller shaft section 60 of unit 56 through a universal joint 61 in well known manner.

Axle housing 53 at one end thereof is provided with a squared portion 62 opposite parallel sides of which engage the sides of the corresponding recess 52 to support this end of housing 53 non-rotatably but adjustably relative to beam 11 thus resisting the driving torque reactions that tend to rotate housing 53 about shafts 55 in operation. The opposite end of housing 53 is supported for universal movement in the corresponding recess 52 by means of engagement of a ball surface 63 of housing 53 with a spherical seating surface in adjustable adapter shoe 63' as illustrated in Figure 4. Thus it will be seen that while housing 53 is secured in beams 11 against longitudinal movement relative thereto it does not restrict the flexibility of the construction relative to up and down and tilting movements of axles 10 while at the same time the driving torque reactions are effectively resisted.

As before stated housing 53 is of the standard construction and in the use thereof in my invention in place of the usual drive wheels carried by the outer ends of axles 55 in ordinary types of vehicles, detachably splined on the outer end of each axle 55 is a dual sprocket wheel 64 held in position by nut 65 around the driving teeth of which are trained oppositely extending sprocket chains 66 driving sprockets 67 carried by and rigidly secured to brake drums 47. It will be noted upon inspection of Figure 1 that rear brake drums 47 are wider than front brake drums 47 in order that sprocket chains 66 may extend around the laterally spaced toothed sections of dual sprocket wheels 64 and be maintained in parallel relationship.

Rigidly riveted or otherwise secured to each sprocket structure 64 is a brake drum 68 co-operating with the usual wheel brake structure 69 supported from housing 53 and operated in the usual manner by links and levers (not shown) from the driver's position.

Suitable means are provided for taking up undue slack in chains 66 and maintaining them sufficiently taut for most efficient operation and which comprises an internally threaded boss 71 within the base of each channel 52 and integral with the adjacent beam 11 as clearly illustrated in Figures 2, 3 and 4. Adjustably threaded in each boss 71 is an adjusting screw 72 provided with a lock nut 73 engaging the inner flanged face of adjacent beam 11 and with the end of one of the screws 72 in engagement with the squared portion 62 of housing 53 and the end of the other screw 72 in engagement with adapter shoe 63' as clearly shown in Figure 4.

A U-bolt 74 provided with nuts 74' has the bight portion thereof engaged about each end of housing 53 within corresponding channels 52 with the parallel leg portions thereof disposed within channels 75 in opposite faces of corresponding recesses 52 as clearly shown in Figure 4, the bight portions of bolts 74 being formed to conform to the squared and round portions of housing 53 at opposite ends thereof.

From the above, it will be seen that upon turning screws 72 and simultaneously oppositely turning nuts 74' the tension of the chains 66 will be adjusted.

In making an adjustment the nuts on the ends of the legs of U-bolts 74 as well as lock nut 73 are loosened, and after the housing 53 is adjusted within recesses 52 lock nut 73 is tightened and the nuts on the ends of the legs of U-bolts 74 are tightened thus firmly holding the opposite ends of housing 53 between the outer ends of screws 72 and bight portions of U-bolts 74.

While the power transmitting means between axles 55 and drive wheels 40 are disclosed as comprising sprocket wheels and chains it is obvious that suitable gear mechanism may be substituted therefor.

It will be seen that a construction is provided utilizing a standard rear axle construction for imparting rotation to tandem drive wheels rotatably supported on tandem dead axles connected together and to the differential drive axle construction in such manner as to resist the driving and brake torque reactions effectively, and that permits desirable flexibility without restricting the spring action. Furthermore, a construction is provided in which novel brake arrangements are utilized in which owing to the fact that two tandem wheels are driven from each drive shaft 55 while only one differential is provided the tendency toward loss of driving traction due to wheel slippage is materially reduced. At the same time the use of only one differential drive mechanism materially simplifies the construction and reduces its cost.

While I have disclosed detailed embodiments of my invention, it is to be understood that my invention is not limited to such details but is defined by the terms of the appended claims.

Accordingly, what I desire to secure by United States Letters Patent and claim as new, is:—

1. In a road vehicle; a drive mechanism comprising a pair of differentially driven shafts; a load carrying axle on each side of said drive mechanism; a pair of members connected to said drive mechanism and said axles; one of said members being rigidly connected to said drive mechanism and the other of said members being flexibly connected to said drive mechanism; drive wheels supporting said axles; and power transmitting means between said drive mechanism and said drive wheels.

2. The construction defined in claim 1 in which said members are alternatively rigidly and flexibly secured to said load carrying axles.

3. In combination with the frame of a road vehicle, a pair of beams yieldably supported from said frame, dead axles supported by the opposite ends of said beams; a drive axle construction adjustably supported by said beams; drive wheels rotatably supported by said dead axles; sprockets carried by said drive axle construction; sprockets carried by said drive wheels; sprocket chains operatively engaged with said sprockets for transmitting motion of said drive axle construction to said drive wheels; and means for moving the drive axle construction relative to said beams to adjust the tension in said chains, said adjusting means comprising adjusting screws in said beams for adjustable engagement with opposite ends of said drive axle construction; and U-bolts engaged with said ends for holding same in any adjusted position against said adjusting screws.

4. In combination with one end of a vehicle frame, a set of tandem wheels at each side of said frame end; a pair of longitudinal members, one supported by each of the sets of wheels and connected to said frame end to support the latter; a transversely arranged driving mechanism and housing therefor; each of said longitudinal members being provided with a vertical guideway for adjustably receiving and supporting one end of said transverse housing; means connected between said wheels and said driving mechanism to drive the former from the latter, said means comprising endless flexible members at opposite sides of the frame; and means for effecting vertical adjustment of said housing ends within said guideways to vary the tension of said endless flexible members.

5. In combination with one end of a vehicle frame, a set of tandem wheels at each side of said frame end; a pair of longitudinal members, one supported by each of the sets of wheels and connected to said frame end to support the latter; a transversely arranged driving mechanism and housing therefor mounted with the ends of said housing supported by the respective longitudinal members at fixed horizontal distances from said wheels; means connected between the wheels and the driving mechanism to drive the former from the latter, comprising a pair of endless flexible members at each side of said frame end; each of said housing ends being vertically adjustable to simultaneously adjust the tension of both of the corresponding endless flexible members; and means for effecting said vertical adjustment and for thereafter retaining said housing ends in adjusted position.

6. In combination with one end of a vehicle frame, a set of tandem wheels at each side of said frame end; a pair of longitudinal members, one supported by each of the sets of wheels and connected to said frame end to support the latter; a transversely arranged driving mechanism and housing therefor mounted with the ends of said housing designed to be supported by the respective longitudinal members; means connecting one end of said housing to its corresponding longitudinal member in a manner to prevent rotation of the housing about its own axis; and means connecting the opposite end of said housing with the other longitudinal member in a manner permitting substantially universal movement therebetween, whereby the torque reactions of said housing are resisted without restricting the flexibility of the apparatus.

In testimony whereof I affix my signature.

WILLARD F. ROCKWELL.